March 22, 1966 W. O. TEMPLE 3,241,498
DRIVING MECHANISM
Filed Sept. 11, 1964 6 Sheets-Sheet 4
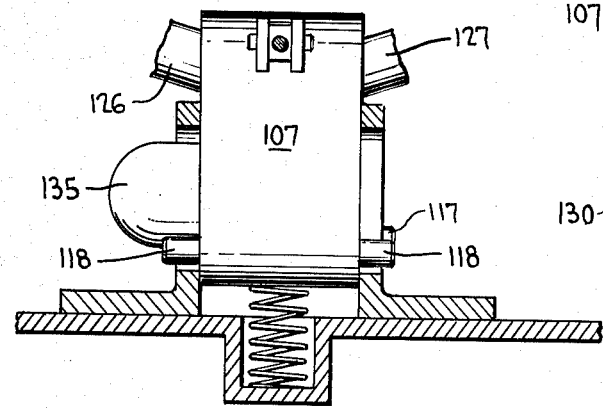
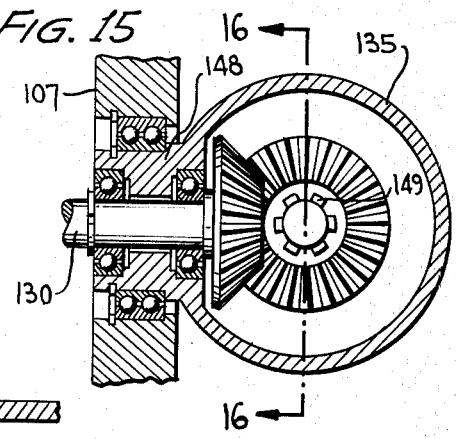
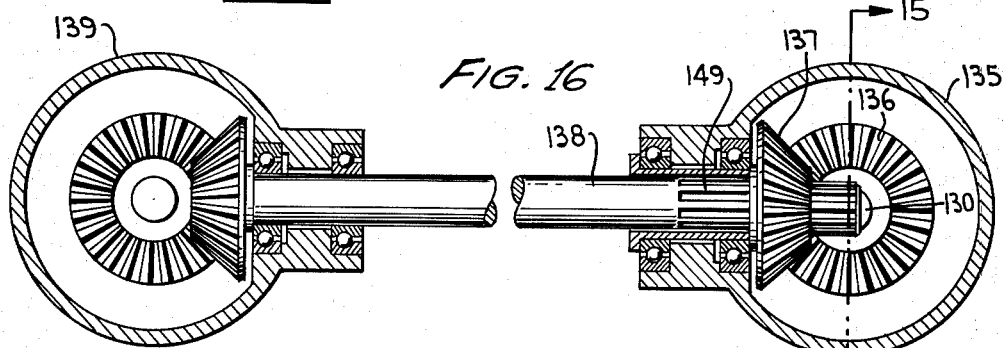
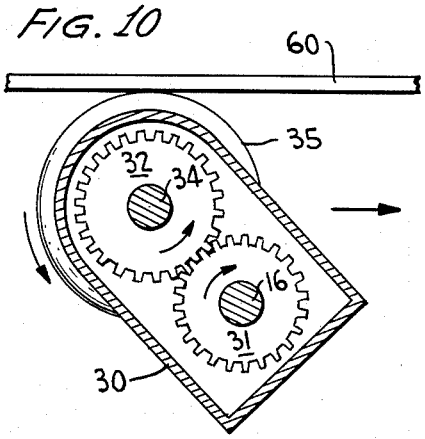
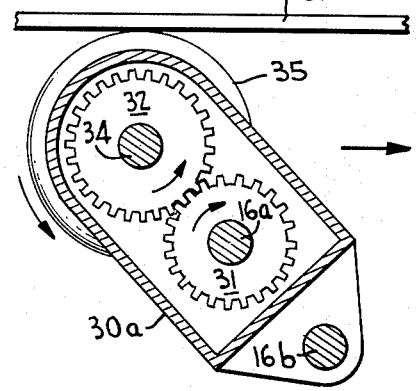
INVENTOR,
WESCOMB O. TEMPLE
BY Watson, Cole, Grindle & Watson
ATTORNEYS March 22, 1966 W. O. TEMPLE 3,241,498
DRIVING MECHANISM
Filed Sept. 11, 1964 6 Sheets-Sheet 5

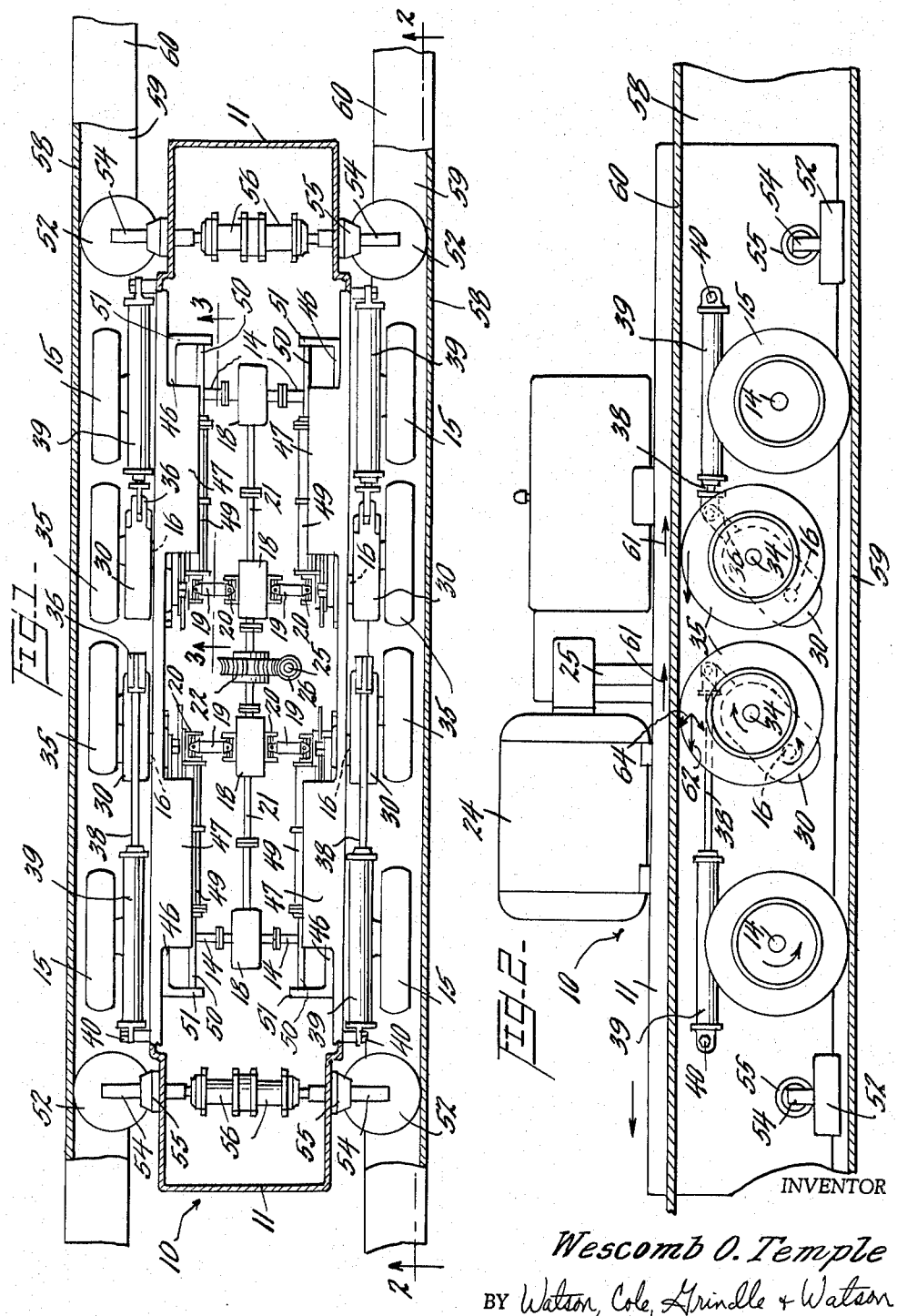

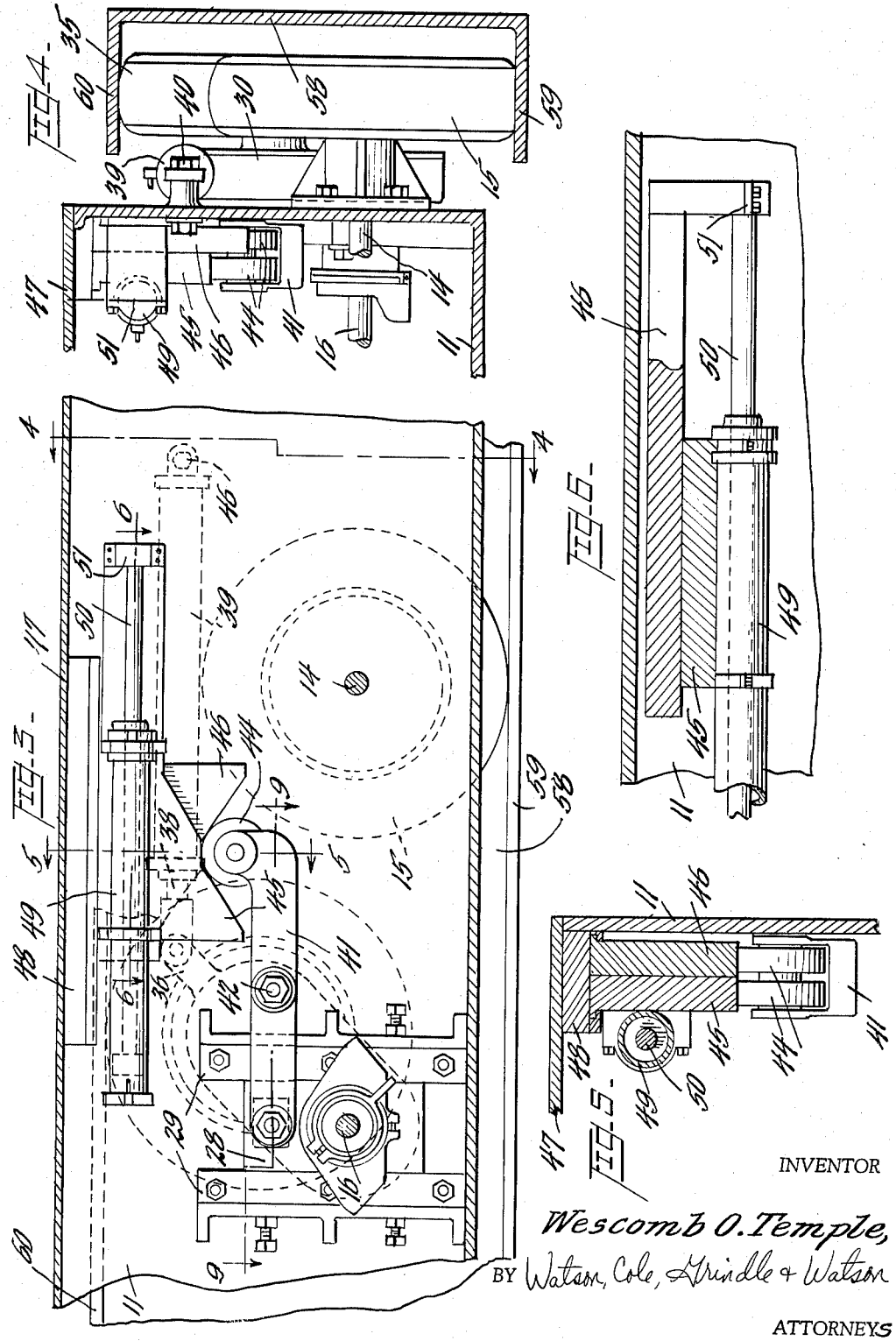

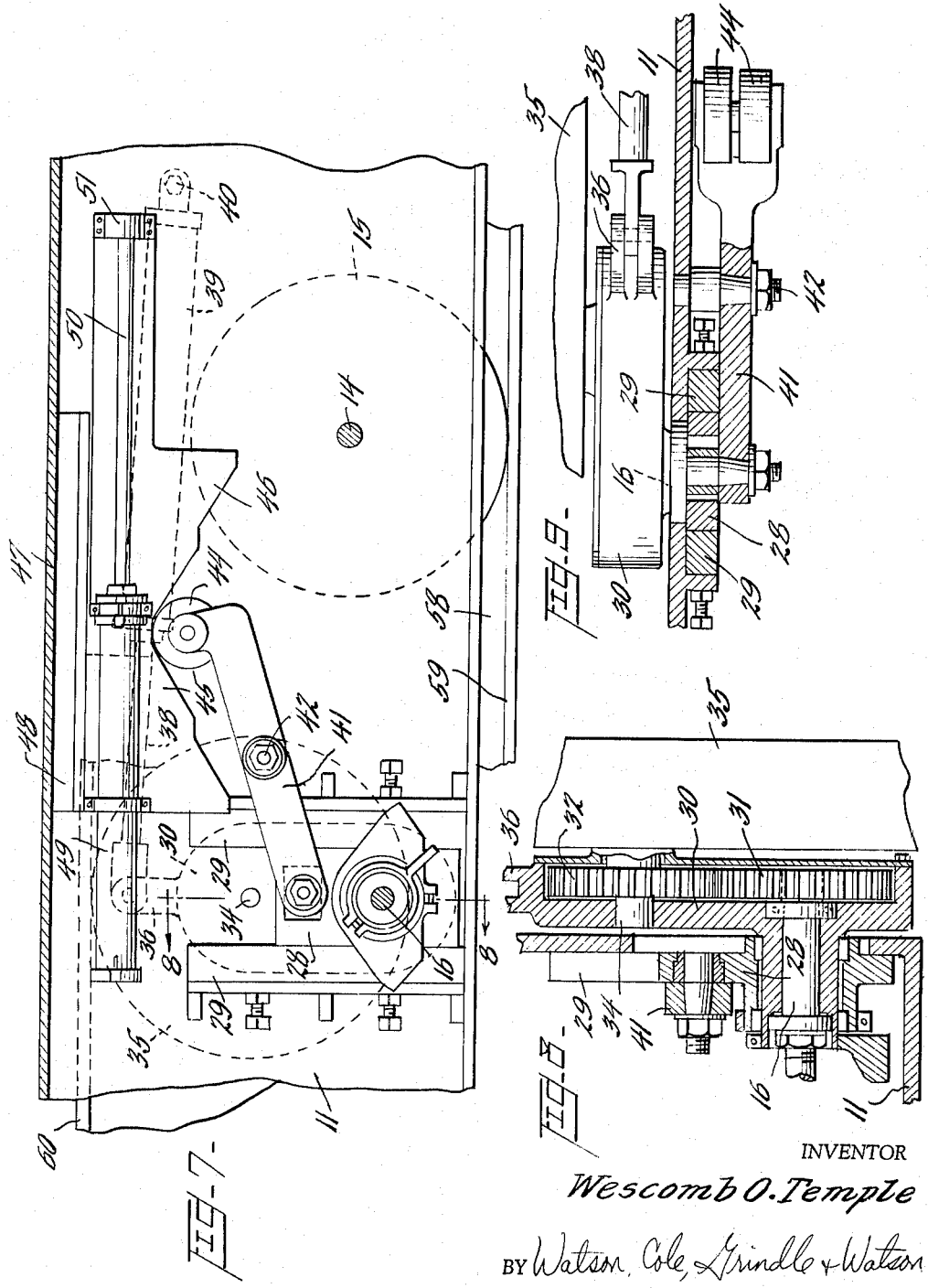

INVENTOR,
WESCOMB O. TEMPLE
BY Watson, Cole, Grindle & Watson
ATTORNEYS

March 22, 1966  W. O. TEMPLE  3,241,498
DRIVING MECHANISM

Filed Sept. 11, 1964  6 Sheets-Sheet 6

INVENTOR,
WESCOMB O. TEMPLE

BY Watson, Cole, Grindle & Watson
ATTORNEYS

United States Patent Office 3,241,498
Patented Mar. 22, 1966

3,241,498
DRIVING MECHANISM
Wescomb O. Temple, R.F.D. 1, Whitefield, N.H.
Filed Sept. 11, 1964, Ser. No. 396,814
22 Claims. (Cl. 105—73)

This invention relates to track guided vehicles and more particularly to track guided vehicles for use on extremely steep grades and in other applications where a high degree of tractive effort is required.

The present application is a continuation-in-part of my copending application Serial No. 87,565, filed February 7, 1961, now forfeited.

Numerous types of track guided vehicles have been proposed in the past. Most of such vehicles have been suitable for applications where the grades encountered were quite small. The maximum tractive effort which could be developed by these prior art vehicles was limited to a force equal in magnitude to the gravitational force exerted on the driving wheels multiplied by the coefficient of friction for the materials of the driving wheels and track. There was no point in increasing the power of the prime mover utilized beyond that which would produce this maximum tractive force since any further increases in power input would simply result in wheel slippage.

It is obvious, of course, that track guided vehicles, whose maximum tractive effort is dependent solely upon the normal force between the drivers and track induced by gravity, suffer drastic reductions in maximum available tractive effort as the grades encountered are increased. This is, of course, due to the fact that the gravitational forces on the vehicle remain vertical so that greater and greater inclination of the track results in a smaller and smaller normal force between the wheels and the track. Manifestly, it would be highly desirable to develop a track guided vehicle in which the normal force, and hence the maximum tractive effort, is not dependent solely upon gravitational forces on the vehicle.

It is therefore a primary object of this invention to provide a track guided vehicle in which the normal force between wheels and track, and hence maximum tractive effort, is not dependent solely upon gravitational forces on the vehicle.

It is another object of this invention to provide a track guided vehicle utilizing a self-energizing drive which automatically increases the normal force between drivers and track as the prime mover responds to increases in load.

It is a further object of this invention to provide a track guided vehicle in which some of the torque inherent in the drive is utilized to increase the normal force between the drivers and the track.

It is yet another object of this invention to provide a track guided vehicle in which some of the drivers are pivotally mounted on the frame and are so driven that the torque inherent in the drive train serves to pivot these drivers into more intimate contact with the tracks.

It is yet another object of this invention to provide a track guided vehicle which may be readily reversed.

It is a still further object of this invention to provide a track guided vehicle embodying means for effecting lateral stabilization of the vehicle on the tracks.

With these and other objects in view, the present invention contemplates a track guided vehicle embodying a frame with a first set of wheels rotatably mounted on the frame. A plurality of gear trains mounting a second set of wheels are pivotally mounted on the frame and a prime mover is provided for rotating some or all of the wheels. The prime mover is driven in such a fashion that the torque inherent in the gear trains tend to urge the pivotally mounted wheels into intimate contact with the rails and thus increase the maximum tractive effort available. Means are provided for supplementing this torque effect if necessary and for shifting the position of the gear trains to accommodate movement of the vehicle in either direction along the track. A third set of wheels is rotatably mounted on the frame and these wheels laterally engage the track to effect lateral stabilization of the vehicle.

Although the driving mechanism per se for the vehicle finds special utility when employed for driving a vehicle in the manner herein disclosed, it is capable of more general application to produce relative movement between any two elements which are guided for such movement along predetermined paths having portions in proximity to each other.

Therefore, further highly important objects of the invention are:

To provide a novel frictional driving mechanism in which the driving torque transmitted to a rotary output member in driving engagement with a reaction surface is divided into two components, one automatically varying the driving pressure of the output member against the surface in accordance with variations in the load imposed upon the output member, and the other tending to rotate the output member; and, To employ the driving thrust of the output member against the reaction surface to still further increase its driving pressure against such surface.

Other objects, advantages and novel features of the invention will become readily apparent upon consideration of the following detailed description when taken in conjunction with the following drawings, wherein:

FIGURE 1 is a top plan view, partially in section, of a track guided vehicle embodying the principal features of the invention and illustrating to advantage the drive mechanism and wheel arrangements;

FIGURE 2 is a view taken along the line 2—2 of FIGURE 1 and illustrates the arrangement of the prime mover and drive wheels including the pivotally mounted wheels;

FIGURE 3 is an enlarged sectional view taken along the line 3—3 of FIGURE 1 and illustrates to advantage the mechanism for shifting the position of the pivotally mounted gear cases and drive wheels to permit reverse operation of the vehicle;

FIGURE 4 is a sectional view taken along the line 4—4 of FIGURE 3 and illustrates further details of the shifting mechanism;

FIGURES 5 and 6 are sectional views taken along the lines 5—5 and 6—6 of FIGURE 3 and illustrate still further details of the shifting mechanism;

FIGURE 7 is a view similar to FIGURE 3 and illustrates a journal block, which mounts the gear train in a depressed position to permit shifting of the gear case in order to accommodate a reversal of the vehicle;

FIGURE 8 is a sectional view taken along the line 8—8 of FIGURE 7 and illustrates details of the gear train and case and the mounting thereof; and FIGURE 9 is a sectional view taken along the line 9—9 of FIGURE 3 and illustrates further details of the shifting arrangement.

Figure 12:
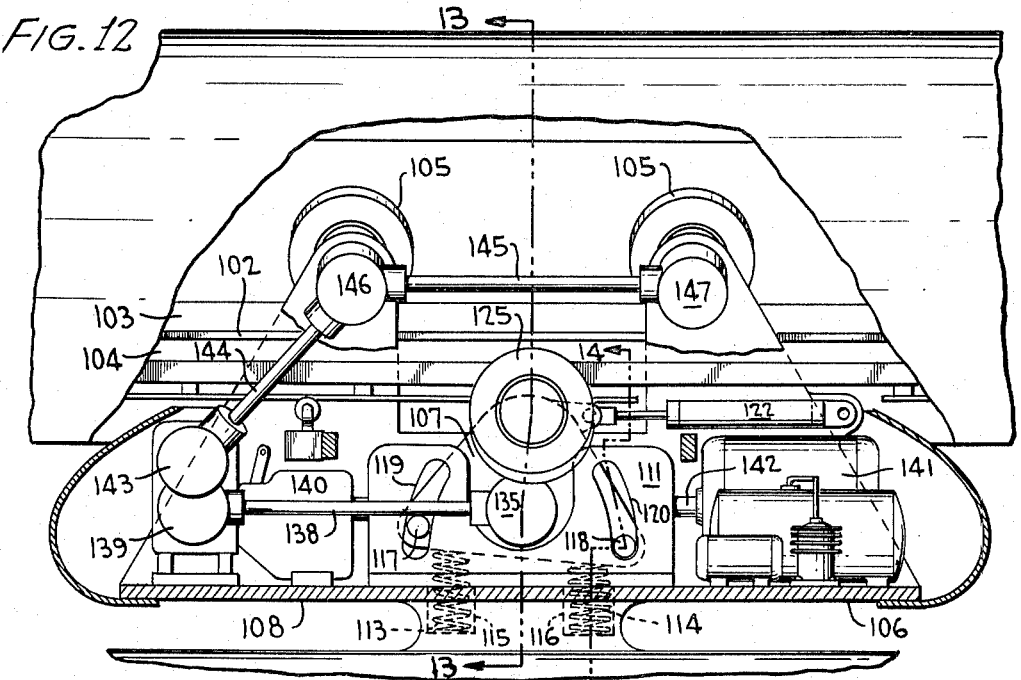
Figure 13:
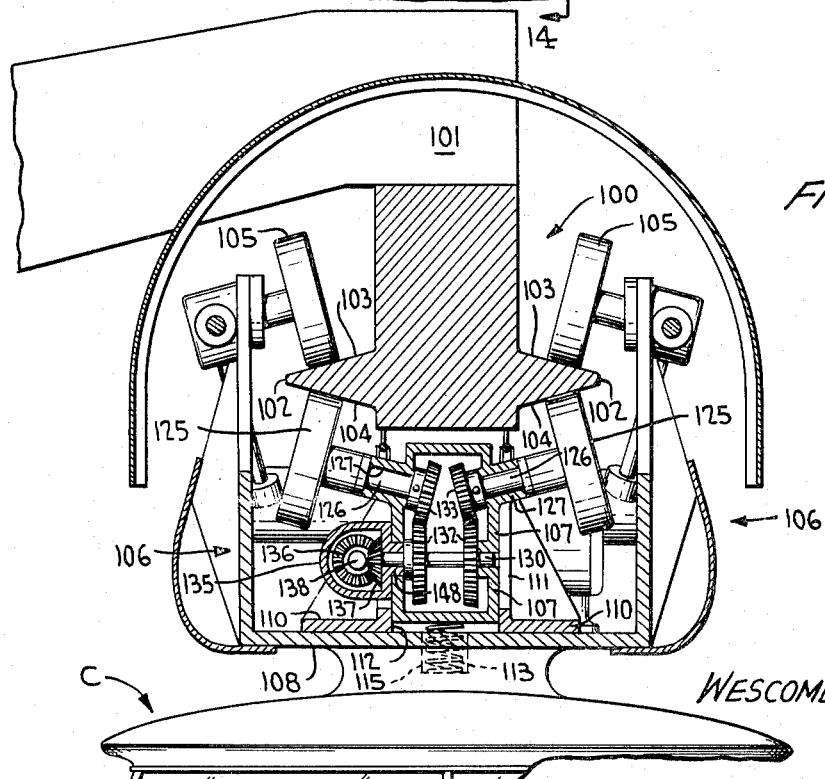

FIGURE 10 is a diagrammatic view, partly in section, of the primary elements of the driving mechanism of the invention;

FIGURE 11 is a view, similar to FIGURE 10, of a modified form of driving mechanism;

FIGURE 12 is a view partly in section and partly in side elevation, of a modified form of monorail device incorporating a modified drive mechanism in accordance with the invention;

FIGURE 13 is a section on the line 13—13 of FIGURE 12.

Figure 17:
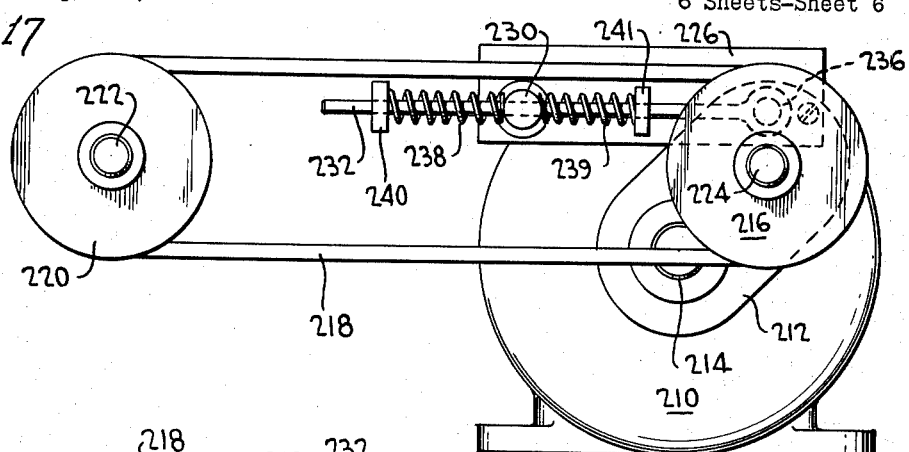
Figure 18:
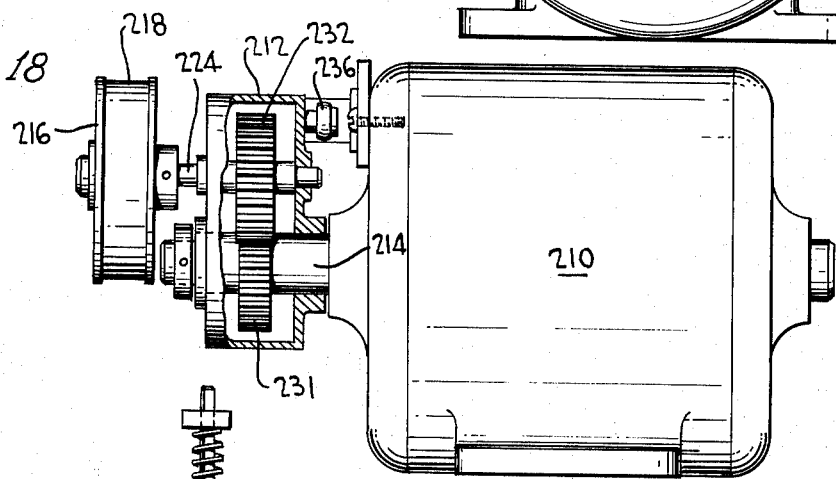
Figure 19:
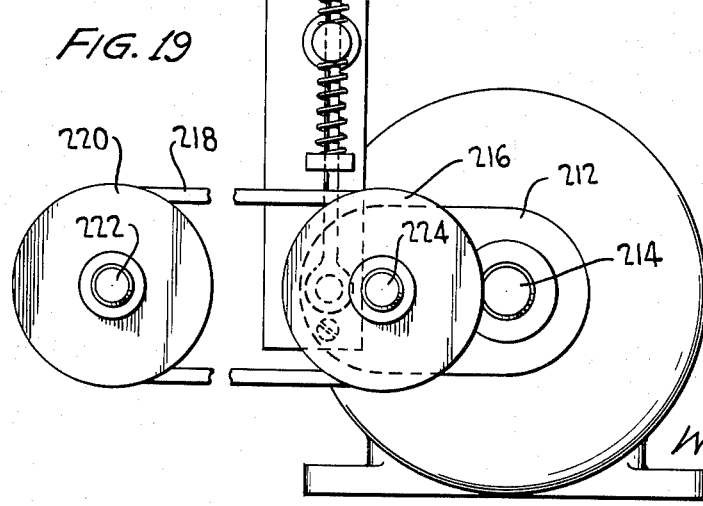

FIGURE 14 is an enlarged detail section on the line 14—14 of FIGURE 13;

FIGURE 15 is a vertical section on line 15—15 of FIGURE 16;

FIGURE 16 is an enlarged detail section on the line 16—16 of FIGURE 15 showing the power transmission to the input member;

FIGURE 17 is a side elevation of a belt drive arrangement incorporating the driving mechanism of the invention;

FIGURE 18 is an end elevation, partly in section, of the structure shown in FIGURE 17;

FIGURE 19 is a view similar to FIGURE 17, of a slightly modified arrangement of the structure shown in FIGURES 17 and 18.

Attention is now directed to the drawings wherein like numerals of reference designate like parts through the several views, and more particularly to FIGURES 1 to 3. The track guided vehicle of the present invention is designated generally by the reference numeral 10 and comprises a substantially rectangular frame 11 in the sides of which are journaled a plurality of shafts 14. A combined driving and load carrying wheel 15 is secured to the outboard extremity of each of the shafts 14. In the disclosed embodiment of the invention the wheels 15 are pneumatic, rubber tired wheels, although it will be obvious that they could be constructed of various materials in either solid or pneumatic form. A second set of shafts 16 is likewise journaled in the frame 11. The shafts 14 and 16 are all operatively connected to differentials 18; the shafts 16 being coupled to the differentials 18 through stub shafts 19 and universal joints 20 for a purpose which will be explained later. The various differentials 18 are all interconnected by means of a common drive shaft 21 which mounts a worm wheel 22 in the center thereof. A power source 24, illustrated as an electric motor, is secured to the top of the frame 11 and is arranged to drive a power shaft 25. The power shaft 25 carries a worm gear 26 which is in mesh with the worm wheel 22. Thus it can be seen that operation of the prime mover 24 transmits power through the shaft 25, the worm gearing 22 and 26, the shaft 21 and the differentials 18 to the shafts 14 and 16. The prime mover 24 can be supplied with electrical power through any suitable means (not shown).

The shafts 16 are journaled in the frame 11 by means of journal blocks 28 (FIGURE 3) which are slidably mounted on ways 29 secured to the inboard sides of the frame 11. A gear case 30 is pivotally mounted on each shaft 16, outboard of the sides of the frame 11, as best illustrated in FIGURE 8. Each gear case 30 contains a gear train comprising gears 31 secured to the shafts 16 and gears 32 journaled at the upper ends of the gear cases 30 on shafts 34. Each shaft 34 mounts a pneumatic, ruber tired wheel 35 similar to the wheels 15. The upper extremity of each gear case 30 is provided with a clevis 36. The clevises 36 are pin connected (FIGURE 9) to piston rods 38 of pneumatic or hydraulic cylinders 39 which are likewise mounted on the outboard sides of the frame 11. The opposite extremities of the cylinders 39 are pivotally connected to the frame 11 by means of pins 40.

The journal blocks 28 are pin connected to levers 41 (FIGURE 3) which in turn are pivotally mounted inboard of the sides of the frame 11 by means of pivot pins 42. The opposite extremity of each of the levers 41 is provided with a pair of cam follower rollers 44 which are in rolling contact with cams 45 and 46. The cams 45 and 46 are mounted for sliding movement along slideways 48 (FIGURES 4 and 5) which are secured to overhanging portions 47 of the frame 11. A pneumatic or hydraulic cylinder 49 is secured to the inboard side of each cam 45 (FIGURE 6). A piston rod 50 of each of the cylinders 49 is secured at 51 to an extended portion of each cam 46.

A plurality of stabilizing wheels 52 (FIGURE 1) are provided at opposite ends of the frame 11 and are mounted on rods 54 for rotation in a plane perpendicular to the plane of the wheels 15 and 35. The rods 54 are slidably mounted in bushings 55 for movement transversely of the frame 11. The rods 54 are coupled to hydraulic or pneumatic cylinders 56 which may be actuated to extend or retract the wheels 52 as necessary in order to effect lateral stabilization of the vehicle while in motion.

*Operation*

In order that a better understanding of the invention might be had, its mode of operation will now be described. The vehicle of the present invention is designed for operation along a track defined by a pair of channel members spaced apart and with the open sides thereof facing inwardly. These tracks are designated 58 in the drawings. The tracks 58 may be supported in any of various ways, for example, they may be suspended from appropriate towers to form an overhead railway system or they may be mounted on the ground or on intermediate structures. The particular mounting utilized for the tracks 58 forms no part of the present invention. Any mounting will be sufficient as long as the tracks are maintained in the same plane with the proper spacing between them. If the power source utilized is an electric motor as illustrated, a trolley wire or bar would be mounted on one of the tracks 58 and appropriate current collecting devices would be mounted on the vehicle 10. Specific devices of this type have not been illustrated since the power source 24 may take various forms.

As illustrated in the drawings, the vehicle 10 is positioned between the tracks 58 with the combined driving and load carrying wheels 15 resting on lower flanges 59 of the channel shaped tracks 58. Since the wheels 15 support the weight of the vehicle 10, traction can be obtained between the wheels 15 and the flanges 59.

For purposes of illustration, movement of the vehicle to the left (as viewed in FIGURES 1 and 2) will be designated as forward movement. To accomplish this, the motor 24 is energized to cause counterclockwise rotation of the shafts 14 and 16, as viewed in FIGURE 2. This will cause the wheels 15 to begin moving the vehicle to the left or in the forward direction. Simultaneously, the rotation of shafts 16, through the interaction of gears 31 and 32, will start the shafts 34 and hence the driving wheels 35 to rotate in a clockwise direction, as viewed in FIGURE 2. Since the driving wheels 35 contact upper flanges 60 of tracks 58, rotation of these wheels will likewise tend to move the vehicle 10 in the forward direction or to the left.

Rotation of the wheels 35 in contact with the flanges 60 applies forces to the flanges 60 in the direction of the arrows 61 in FIGURE 2. These forces are applied to the flanges 60 at the points of contact between the wheels and the flanges. Since for every action there is an equal and opposite reaction, reactive forces will be applied to the wheels 35 in the direction of the arrows 62. These forces are applied to the wheels at the point of contact between the wheels and the flanges. The force represented by the arrow 62 may be broken down into component forces parallel to and perpendicular to the axes of the gear cases 30 which intersect the centers of the shafts 16 and 34. The components 64 of the forces 62 cause the gear cases 30 to tend to rotate in a counterclockwise direction, as viewed in FIGURE 2, about the centers of the shafts 16. This effect forces the wheels 35 into more intimate contact with the flanges 60 and thus increases the normal force between the wheels 35 and flanges 60. Also, the reactions to these increased normal forces between the wheels 35 and flanges 60 increase the normal forces between the wheels 15 and flanges 59 beyond that induced by gravitational attraction.

on the vehicle 10. Thus it can be seen that the normal forces between the driving wheels and the tracks can be greatly increased due to the self-energizing effect and thus the maximum tractive effort available can be increased well beyond that due to gravitational attraction alone. Additionally, as the prime mover responds to increases in load, the torque applied to the wheels 35 will be increased with an attendant increase in the forces 61 and 62 to provide a still further increase in traction.

Prior to the energization of the motor 24, pressurized fluid may be applied to the cylinders 39 to rotate the gear cases 30 in a counterclockwise direction, as viewed in FIGURE 2, and thus effect initial engagement of the wheels 35 with the upper flanges 60. The foregoing description of operation presupposed this condition. Alternatively, the inlets and outlets of the cylinders 39 may be vented to a sump; in which case gravity would rotate the gear cases 30 in a clockwise direction until the wheels 35 engaged the lower flanges 59. In this instance the initial application of torque to the shafts 16 would cause counterclockwise rotation of the gear cases 30 until the wheels 35 engaged the upper flanges 60. The drive would then operate as previously described. Also, the self-energizing effect of the drive arrangements for the wheels 35 may be supplemented by increasing the pressure of the fluid supplied to the cylinders 39. This will tend to cause additional counterclockwise rotation of the gear cases 30 and thus further increase the normal forces of the wheels on the flanges of the tracks 58.

It will be obvious that the normal forces produced by the self-energizing drive of the present invention are independent of any inclination of the tracks 58 with respect to the horizontal. The only effect of an inclination of the tracks 58 will be a reduction of the initial normal force between the wheels 15 and flanges 59 induced by gravitational forces. Thus the drive of the present invention will operate on vertically disposed tracks for elevators as well as on horizontal or inclined tracks.

In order to operate the vehicle in a reverse direction, or to the right, as viewed in FIGURE 2, pressurized fluid is applied to the cylinder 49, FIG. 7, in such a manner as to extend the piston rods 50. Since the cylinders 49 are fastened to the cams 45 and the piston rods 50 are secured to the cams 46, extension of the piston rods 50 will effect a separation of the cams 45 and 46, until they assume the position shown in FIGURE 7. The journal blocks 28 are urged downwardly along the ways 29 due to the influence of gravity. Since the journal blocks 28 are connected to the levers 41 and counterclockwise movement of the levers 41 is prevented due to engagement of the rollers 44 with the cams 45 and 46, the journal blocks are normally retained in the position shown in FIGURE 3. However, separation of the cams 45 and 46 permit counterclockwise movement of the levers 41 and hence depression of the journal blocks 28. When the journal blocks 28 have descended to the position shown in FIGURE 7, the gear cases 30 will assume an upright position. Pressurized fluid is then supplied to the cylinders 39 to further rotate the gear cases 30 about the centers of the shafts 16 until the gear cases are inclined to the left rather than to the right, as viewed in FIGURE 2. The vehicle may then be driven in the reverse direction by reversing the direction of rotation by motor 24. Since the gear cases have been shifted to the left, the self-energizing feature of the drives for the wheels 35 will function as previously described.

During operation of the vehicle in either direction the stabilizing wheels 52 are urged outwardly by means of the cylinders 56 into engagement with the web portions of the tracks 58. These wheels 52 provide lateral stabilization of the vehicle 10 and serve to prevent side sway.

In the embodiment of the invention as thus far described and as illustrated in FIGURES 1 through 9, inclusive, the input member 31 is mounted for rotation about an axis coincident with that of the drive shaft 16 and also the rotational axis defined by the shaft 34 of the output member 35 has been parallel to the axis of the input member. However, it has been found that neither of these conditions is essential to successful operation of the invention.

With respect to the relative locations of the pivotal axis of the frame or gear casing 30 and the rotational axis of the input member 31, the effect of relative spacing of these axes may best be explained by reference to and comparison of the structures shown diagrammatically in FIGURES 10 and 11. The structure shown in FIGURE 10 corresponds to that of the preferred embodiment earlier described, and the several parts are accordingly designated by reference numerals similar to those heretofore employed. Thus, both the gear casing or supporting member 30 and the input member 16 in this view are shown as having their rotational axes coincident with each other and defined by the shaft 16, whereby rotation of the input member in a clockwise direction as indicated by the arrows acts through the intermeshing gears 31 and 32 to produce an opposite rotation of the output member 35. Thus, frictional engagement of the member 35 with the reaction member 60 will tend to cause movement of the gear box or support 30 toward the right and movement of the reaction member 60, in the event the latter is movable toward the left. Any resistance to rotation of the output member 35 will produce a reaction such as has been earlier mentioned tending to rotate the support 30 and to increase the pressure of output member 35 toward the surface of reaction member 60. Thus, the pressure between these surfaces is varied in accordance with the loading of the output member. Further, as has been earlier explained, the driving thrust of the output member 35 against the reaction surface of the member 60 will exert a toggle action, still further tending to pivot the support 30 in a clockwise direction to further increase the pressure between the members 35 and 60.

Comparing this structure with that shown in FIGURE 11 it is to be noted that in FIGURE 11 the same parts are employed, and are thus designated by similar reference characters as in FIGURE 10, except that the rotational axis 16a of the input member 16a is displaced from the pivotal axis 16b of the support 30a to be disposed generally between the axis 16b and the rotational axis 34 of the output member 35. It is to be understood that the input member or shaft 16a in FIGURE 11 will be connected to its source of power in the same manner as is true of the input shaft 16 in FIGURE 10 or, in other words, through a universally jointed shaft 19. Thus, the shaft 16a will be driven from such universally jointed shaft 19 even though it is swingable around the pivotal axis 16b of the housing or support 30a.

With this arrangement, any resistance to rotation of the output member 35 will create a reactionary force tending to rotate the entire support or supporting frame 30a in a clockwise direction about the input axis 16a, thereby increasing the driving pressure of the output member 35 against the reaction member 60 in accordance with increases in load on the output member 35. The resulting action will thus be precisely as described in connection with the earlier embodiment of the invention; and the toggle action produced by the driving engagement between the output member 35 and reaction member 60 and tending to swing the support 30a about its pivotal axis 16b will also come into play here at least to the same extent as in the earlier described embodiment.

It has been found that such a modification in which the rotational axis of the input member is displaced from the pivotal axis of the support may have particular utilization in a modified form of the invention shown in FIGURE 12 and FIGURE 13 of the accompanying drawings. Also, in such modification, it will be noted that the rotational axis of the output member is desirably angularly disposed, both with respect to the axis of the input member and the pivotal axis of the housing. Also, the axis of the output members may be in a vertical plane inclined to the axes of the input members, if desired, in order to achieve a "toe-in" of the output members. Referring now in more detail to this embodiment, the supporting member therein is exemplified by the monorail 100 suspended from a suitable rigid support 101, of which it is to be understood a plurality will be provided generally at spaced intervals along the monorail 100. The monorail 100 is provided with oppositely horizontally projecting flanges 102, each of which is defined by outwardly converging upper and lower surfaces 103 and 104, respectively. These upper surfaces 103 are adapted as track ways for the trolley wheels 105 of a suitable monorail truck, generally designated 106, from which a passenger or cargo compartment C is suspended and supported for movement along the rail. The truck 106 constitutes a support member which is guided for movement by the trolley wheels 105 in such a manner that the members 100 and 106 are supported for relative movement along paths in which the truck members or support members 106 is at a generally constant distance from reaction surfaces defined by the downwardly presented tracks 104 directed toward the support member 106.

In this structure, the rigid supporting member or frame 107 for the driving means or mechanism of the invention is connected to the support member 106 for angular movement selectively about either of two pivotal axes on the support member in such manner that it may be actuated to drive the truck in either direction along the rail 100.

In order to thus provide selectively and alternately usable pivotal connections between the supporting frame 107 and the truck 106, there is secured to the horizontal floor 108 of the truck a rigid bracket 110 provided with relatively spaced vertical guide walls 111 and 112, respectively, within which the supporting frame 107 is slidably guided for vertical movement. Springs, such as 113 and 114, are compressed between the lower edge of the supporting frame 107 and the inner ends of sockets or blind bores 115 and 116, respectively, opening upwardly through the horizontal floor 108 of the truck. These springs are spaced apart preferably adjacent and beneath opposite longitudinal end portions of the frame 107 and project it resiliently upwardly between the guide plates or walls 111 and 112, to maintain a nominal minimum working pressure of the output member against the reaction member 100.

Trunnions or stub shafts 117 and 118 fixed to the pivoted supporting frame 107, in longitudinally spaced relation in the direction of the relative movement above mentioned, project from opposite lateral sides of the frame transversely to the above-mentioned relative movement between the truck 106 and the track 100. These trunnions are received and guided for movement in guide slots 119 and 120 in the respective guide plates or walls 111 and 112. It is to be noted that each such guide slot is arcuately curved about a center concentric with the semi-circular lower end of the other such slot so that either end of the frame 107 may be swung about a pivotal axis defined by the trunnions at the opposite end thereof, when journalled in the lower end of its respective guide slot.

Tilting of the frame 107 to seat either of its trunnions 117 or 118 in the lower end of its associated guide slot may be achieved merely by reversing the direction of drive of the output wheel or member 125, whereby the reversal of its driving thrust against the trackways 104 will achieve the necessary tilting automatically.

In this embodiment of the invention, there are provided a pair of rotary output members 125 of identical although symmetrical arrangement for engagement with the laterally spaced reaction surfaces 104—104 of track 100. Both are carried by the frame 106 for rotation about axes defined by their respective axles 126 extending transversely to the direction of relative movement between the truck or supporting member 106 and the reaction member or rail 100. In the present embodiment, it will be noted that the axles 126 project transversely in opposite directions from the supporting frame, which here constitutes a hollow gear case, and are disposed for rotation in suitable bearings 127 and opposite sides of the frame. With the shafts 126 thus angularly disposed and preferably though not necessarily parallel in a transverse plane to the reaction surfaces 104—104, respectively, it will be apparent that the rotary output members exemplified by the drive wheels 125 will rotate in planes aligned with the direction of relative movement of members 100 and 106, for rolling movement longitudinally of the reaction track surfaces 104—104 in efficient frictional driving engagement with same. Regardless of which of the alternatively usable stub shafts 117 or 118 is employed to establish a fixed pivotal connection or axis about which the frame 107 may swing, it will be apparent that each of the output members 105 is spaced from such pivotal axis for movement through an arcuate path which intersects the reaction surface 104 of the rail 100 so that, at a given location along this path the periphery of each output member will drivingly engage the reaction surface 104. The fluid-actuated unit 122 may be utilized to urge the supporting frame 107 in whichever direction is desired about either of its trunnions 117 or 118 to urge the drive wheels 125 into engagement with the reaction surfaces 104 and to maintain them in such engagement preferably at a substantially constant minimum of pressure which will be automatically increased as necessary in response to loads on the driving wheels 125.

The driving wheels or output members 125 are driven from an input member exemplified by the transverse shaft 130 journalled across the interior of the frame 107 for rotation about an axis extending in the same general direction as the respective pivotal axes defined by the trunnions 117 and 118. For interconnecting the input and output members 130 and 125—125 for rotation in opposite senses, there is employed any suitable means, exemplified in the present instance by the gears 132—132 keyed on the shaft 130 and in intermeshing driving relation respectively with bevel gears 133 fixed to the axles 126 within the hollow swingable support member or frame 107.

The input member, or shaft, 130 in turn has one end received in a hollow gear box 135 to be driven through intermeshing bevel gears 136 and 137 from a drive shaft 138 journalled through one end of the gear box for rotation about an axis extending longitudinally in the direction of relative movement between the truck and the track or rail 100.

This shaft 138 in turn is rotatably received and supported in a gear box 139 constituting one of the components of a power transmission unit 140 carried by the truck 106. The transmission 140 in turn is powered by means of motor 141 also mounted on the truck 106 and operatively connected to the transmission 140 by its output shaft 142.

It will be apparent that, if desired, the first set of wheels 105—105, by means of which the truck or support member and the reaction member 100 are guided for relative movement, may be powered from the same motor or other power source 141 and transmission 140 through the gear box 143. Power from gear box 143 is transmitted to the upper wheels or suspension wheels 105 through the conventional drive shafts 144 and 145 operatively associated with the gear boxes 146 and 147, respectively, of the drive wheels.

In order that the shaft 138 and its associated power source and transmission means may transmit rotation to the input shaft member 130 despite angular movement of the supporting frame 107 about either of its axes 117 or 118, both gear boxes 135 and 139 are mounted for rotary movement about parallel axes perpendicular to the shaft 138, in the manner specifically shown by way of example, in connection with gear box 135. It will be seen that the gear box 135 is provided with an annular collar 148 through which the shaft 130 is journalled and which, in turn, is rotatably journalled through the side wall of casing or frame 107. Provision is thus made for the vertical component of the angular movement of the input member 130 about either axis 117 or 118. The horizontal or longitudinal component of such movement is permitted by virtue of a splined connection 149 between the drive transmitting shaft 138 and the bevel gear 137 from which the shaft 138 is driven by intermeshing of gear 137 with the driving bevel gear 136.

In the operation of the invention, with the output wheels or members 125 swung upwardly and pressed into driving engagement with the reaction surfaces 104 about the axis of the trunnions 118 as shown in FIGURE 12, rotation of the output members 105 in a counterclockwise direction will drive the truck 106 toward the right-hand of that figure. On the other hand, reversal of rotation of members 105 will swing or tilt the frame 107 to the left so that its trunnion 117 will seat in the lower end of guide slot 119 to provide the pivotal connection or fulcrum for frame 107.

Assuming that the supporting frame 107 is tilted about its axis 118, with the drive wheels 105 driven in counterclockwise direction in operative driving engagement with the lower reaction surfaces 104 of the track 100, this will result in movement of the truck 106 to the right along the track.

In order to thus produce counterclockwise rotation of the output wheels or members 105, it is necessary to rotate the input member or shaft 130 in an opposite or clockwise direction due to the gearing means 132 and 133 interconnecting the input and output members for rotation in opposite senses or, in other words, for rotation in such manner that relatively adjacent portions of their peripheries move in the same direction.

With the input member 130 thus driven in a clockwise direction, a portion of the torque transmitted through said member is delivered through the gearing 132 and 133 to drive the wheels or output members 125, and also a portion of the torque reacts on the hollow frame or casing 107 to urge same in a clockwise direction about the axis of the input shaft or member 130. The extent of this torque which thus acts upon the pivoted frame 107 will obviously increase in accordance with loads on the wheels 125 tending to resist their rotation.

The clockwise rotational force on the frame 107 with respect to the axis provided by the input shaft 130 is opposed by the fixed pivotal connection 118 between the frames and supporting member, with the result that this rotational force is caused to urge the frame 107 angularly about pivotal axis 118, since no other portions of the frame 107 are thus restrained from angular movement, it being recalled that the driving connection between the input member 130 and its power source is such as to permit continuance of the drive despite angular movement.

It will be readily apparent that the same mode of operation will occur when the frame 107 is tilted upwardly about its axis as defined by the trunnions 117 to relatively reverse the direction of movement or relative movement of the truck along the guide rail 100.

It will be readily apparent that the upper and lower sets of wheels, or in other words the trolley wheels 105—105 and the drive wheels 125—125 are laterally spaced at distances substantially smaller than the maximum width of the guide rail 100 between the outer extremities of its flanges 102—102 and furthermore that the spacing between the wheels of each pair is such that abutment in an axial direction between the wheels and the main central body of the rail 100 will positively prevent any of the wheels from riding off their rail surfaces, and normally the pendulum action of the passenger compartment C will exert a centering force.

While further more refined features are contemplated for effectively centering the wheels on the rail, these and various improvements in the device will constitute the subject matter of a separate application and are not part of the invention herein disclosed and claimed.

In order to further illustrate the versatility of the invention, FIGURES 17, 18 and 19 illustrate how the inventive concept may be incorporated in an otherwise generally conventional belt drive structure to automatically increase the belt tension as the torque or load on the drive pulley is increased.

In the arrangement of FIGURES 17 and 18, the conventional electric motor 210 is employed as a support member. Accordingly, the rigid frame or housing 212 is pivoted on the drive shaft 214 of the motor for angular movement about the pivotal axis provided by and coaxial with the drive shaft. The rotary output member, which is here exemplified by a conventional drive pulley or sheave 216, is carried adjacent the outer end of the swingable support or frame 212 for angular movement therewith about the motor shaft 214. A flexible drive element, exemplified by the conventional belt 218, may be disposed in a conventional manner for movement through an endless circuit defined jointly by the drive pulley 216 and a driven pulley 220 which is supported on the driven shaft 222.

It will be seen that the output member exemplified by the drive pulley 216 has its hub fixed to a drive shaft 224 which is journaled through the casing 212 adjacent the outer end of the latter, and spaced from the pivotal mounting afforded by the drive shaft 214. Although the shaft 224 is shown in this instance as parallel to the shaft 214, it will suffice for the purposes of the invention simply that it extend substantially in the same direction. As in the preceding embodiments, the means exemplified by the intermeshing gears 231, 232 within the rigid frame or housing 212 and fixed to the respective shafts 214 and 224, serve to interconnect the input member 214 and the output member 216 for rotation in opposite senses. The motor 210 will of course be operative to drive the input member 214 in any of the angular positions of the frame 212.

With this arrangement, it will be apparent that the belt 218 constitutes a reaction member having a portion 218 extending around and operatively engaging a portion of the periphery of the drive pulley 216. The drive pulley itself constitutes a means for guiding the engaged portions, both of the reaction member 218 and the pulley 216 itself, for relative movement generally transverse to, and across the path of angular movement in a clockwise direction of, the frame 212 and pulley 216 about the axis provided by the motor shaft 214.

Since the belt or reaction member 218 is restrained by means exemplified by the driven pulley 220, against such angular movement with the output member or pulley 216, any torque acting upon the frame 212 incident to clockwise rotation of shaft 224 will press the pulley 216 into driving engagement with belt 218. Any increase in such torque resulting from increased loading of the motor shaft 214 will of course automatically increase the driving engagement and the resulting belt tensioning so that the belt may automatically be tensioned to correspond with the requirements imposed upon it by increasingly heavier loads. Conversely, decreasing of the loads will result in automatic decreasing of the belt tension. Thus, the belt may be maintained at all times at substantially the appropriate tension for a given load and need not be over-tensioned when handling small loads or idling.

If desired, there may also be employed in connection with such a belt drive, a means for automatically limiting or restricting the amount of torque transmitted through it. There is thus shown a mechanism or attachment which is optionally useable in combination with the invention to cause slippage of the belt 218 when the torque imposed on the frame or swingable support 212 about axis 214 exceeds a predetermined amount. Such a device comprises a base 226 which at one end is fixedly connected to the motor housing. Adjacent to its free end, this base 226 carries a pivoted lug or post 230 through which is slidably disposed and guided a link 232. Link 232 has one end pivotally connected at 236 to the free end portion of frame 212 remote from the pivotal mounting 214 of the frame.

Springs 238 and 239 respectively are slidably disposed on the link 232 under compression between the rotary stud 230 and stops or abutments 240 and 241 respectively to resiliently oppose the sliding longitudinal movement of the link through the stud 230. Thus it will be seen that as the load imposed upon the driving motor increases, the resulting torque acting upon the swingable frame 212 and tending to swing it in a clockwise direction, will tend to draw the link to the right, thus gradually compressing the spring 238 against the stud 230. When such movement and the resulting compression of spring 238 become such as to equal the action of the torque, further increases in the load imposed upon the motor will result in slippage of the belt. It will be readily apparent also that in addition to the slippage action caused as a result of its limiting function, the lengthwise displacement of the link 232 may be relied upon to actuate a suitable shutoff switch for the motor 210, or to disconnect a clutch interposed between the motor and the output member 216. While the reaction member 218 is here exemplified as a conventional drive belt, it will be apparent that it may also take the form of the rope, chain or other conventional flexible power transmission device.

In the foregoing arrangement of parts, as illustrated in FIGURES 17 and 18, the torque limiting device 226–241 is operative only during clockwise rotation of the motor shaft 224. However, FIGURE 19 illustrates how the same torque limiting device may be positioned on motor 210 so that both it and the automatic belt tensioning mechanism will be operative in either direction of rotation of the motor output shaft 224.

Thus in FIGURE 19, the torque restricting attachment is affixed to the motor housing in a position such that, with the motor 210 de-energized, the opposed springs 238 and 239 will balance each other in a position in which the link 232 extends transversely to the common plane of shafts 214 and 222, and the pivotal connection 236 of the link to the frame 212, together with the axis 224 of output member 216, both lie in said common plane.

With the parts so arranged, energizing of the motor 210 to drive its output shaft 214 (also constituting the input member of the drive mechanism) in either direction of rotation, and the incidental exertion of torque on the frame 212 will cause endwise displacement of the link 232 in one direction or the other from its neutral or balanced position as shown in FIGURE 19. This displacement will be opposed with increasing force by one or the other of springs 238, 239, up to the point where such opposition equals the torque, following which increased loading of the motor will result in belt slippage.

What is claimed is:

1. A track guided vehicle for operation on a track having generally oppositely facing wheel engaging surfaces, said vehicle having a first wheel journaled thereon for engaging a first one of said track surfaces, means for driving said vehicle comprising a shaft journaled in said vehicle transversely thereof, a gear case pivotally mounted on said vehicle adjacent said shaft, a second wheel journaled in said gear case, a train of gears in said gear case operatively connecting said shaft and said second wheel, the rotational axis of said second wheel being disposed rearwardly of said shaft relative to the desired direction of movement of said behicle, the distance from the axis of said shaft to said second track surface being less than the radius of said second wheel plus the distance between said second wheel and shaft axes, whereby rotation of said shaft in the direction to produce the desired movement of said vehicle urges said second wheel into more intimate contact with said second track surface, and means on said vehicle for rotating said shaft.

2. A track guided vehicle as defined in claim 1 wherein said first wheel is a load bearing wheel.

3. A track guided vehicle as defined in claim 1 wherein said first wheel is also driven by said rotating means.

4. A track guided vehicle as defined in claim 1 wherein means are provided for urging rotation of said gear case in a direction to press said second wheel into more intimate contact with said second track surface.

5. A track guided vehicle as defined in claim 4 wherein means are provided for shifting said shaft vertically away from said second track surface whereby said urging means can position said gear case on either side of the line of such vertical movement to permit reversal of the direction of movement of said vehicle.

6. A track guided vehicle as defined in claim 1 wherein a set of wheels is mounted on said vehicle for rotation in a plane inclined with respect to said first and second wheels and including means for urging said last-mentioned wheels into engagement with said track for effecting lateral stabilization of said vehicle.

7. A track guided vehicle for operation on a track of channel shape in cross-section and having upwardly and downwardly facing interior wheel-engaging surfaces on the flanges thereof, said vehicle having a load bearing wheel journaled thereon for engaging said upwardly facing surface, means for driving said vehicle comprising a shaft journaled in said vehicle transversely thereof, a gear case pivotally mounted on said vehicle adjacent said shaft, a driven wheel journaled in said gear case and below said downwardly facing track surface, a train of gears in said gear case operatively connecting said shaft and said driven wheel, the rotational axis of said driven wheel being disposed rearwardly of said shaft relative to the desired direction of movement of said vehicle, the distance from the axis of said shaft to said downwardly facing surface being less than the radius of said driven wheel plus the distance between said driven wheel and shaft axes, whereby rotation of said shaft in the direction to produce the desired movement of said vehicle urges said driven wheel axis toward said second track surface, and means on said vehicle for rotating said shaft.

8. A track guided vehicle as defined in claim 7 wherein said load bearing wheel is also driven by said rotating means.

9. A track guided vehicle as defined in claim 7 wherein means are provided for urging rotation of said gear case in a direction to press said driven wheel into more intimate contact with said downwardly facing surface.

10. A track guided vehicle as defined in claim 9 wherein means are provided for shifting said shaft vertically away from said downwardly facing surface whereby said urging means can position said gear case on either side of the line of such shifting movement to permit reversal of the direction of movement of said vehicle.

11. A track guided vehicle as defined in claim 7 wherein a set of wheels is mounted on said vehicle for rotation in a plane perpendicular with respect to said load bearing and driven wheels and engageable with the web portion of said track for effecting lateral stabilization of said vehicle.

12. A track guided vehicle for operation on a track defined by a pair of channel members having the webs thereof substantially vertically disposed, said channel members being spaced apart to accommodate the vehicle and having the flanges thereof extending inwardly to provide upwardly and downwardly facing wheel-engaging surfaces on the interior faces thereof, said vehicle having a set of load bearing wheels journaled thereon for engaging the upwardly facing surfaces on the lower flanges of said channel members, means for driving said vehicle comprising a plurality of shafts journaled in said vehicle transversely thereof, a gear case pivotally mounted on each shaft, a driven wheel journaled on each said gear case adjacent the free end thereof, a train of gears in each gear case operatively connecting said shafts and said driven wheels, the rotational axes of said driven wheels being disposed rearwardly of said shafts relative to the desired direction of movement of said vehicle, the distance from the axes of said shafts to said downwardly facing surfaces on the upper flanges of said channel members being less than the radius of said driven wheels plus the distance between said driven wheel and shaft axes, whereby rotation of said shafts in the direction to produce the desired movement of said vehicle urges said driven wheels into more intimate contact with said downwardly facing surfaces, means on said vehicle for rotating said shafts and said load bearing wheels, means for urging rotation of said gear cases in a direction to urge said driven wheel axes toward said downwardly facing surfaces, means for shifting said shafts vertically away from said downwardly facing surfaces whereby said urging means can position said gear cases on either side of the line of transverse movement to permit reversal of movement of said vehicle, a set of stabilizing wheels mounted on said vehicle for rotation in a horizontal plane, and means for urging said stabilizing wheels into engagement with the web portions of said channel members for effecting lateral stabilization of said vehicle.

13. In combination with a fixed track, a traction device comprising an input shaft, a gear case pivotally mounted on said shaft, a rotary output member engaging said track and journaled on said gear case for rotation about an axis parallel to and spaced from the axis of rotation of said input shaft, a train of gears in said gear case operatively connecting said shaft and said output member for rotation in opposite senses, means for rotating said input shaft, and means journaling said input shaft on said device at a distance from said track which is less than the radius of said output member plus the distance between the axes of rotation of said shaft and said output member.

14. A traction device comprising support means, an input shaft journaled on said support means, a gear case pivotally mounted on said support means adjacent said shaft, a rotary output member journaled on said gear case for rotation about an axis parallel to and spaced from the axis of rotation of said input shaft, a train of gears in said gear case operatively connecting said shaft and said output member for rotation in opposite senses, a fixed reaction member engaging said output member, means supporting said reaction member at a distance from the pivotal axis of said pivotally mounted gear case which distance is less than the radius of said output member plus the distance between the axis of said output member and said pivotal axis, whereby torque applied to said input member is divided into two components, one urging said output member against said reaction member and the other rotating said output member about its axis to produce translational movement of said device along said reaction member, and means for rotating said input shaft.

15. A traction device comprising support means, an input shaft journaled on said support means, a member pivotally mounted on said support means adjacent said shaft, a rotary output member journaled on said pivoted member for rotation about an axis parallel to and spaced from the axis of rotation of said input shaft, a train of gears operatively connecting said shaft and said output member for rotation in opposite senses, a fixed reaction member engaging said output member, means supporting said reaction member at a distance from the pivotal axis of said pivotally mounted member which distance is less than the radius of said output member plus the distance between the axis of said output member and said pivotal axis, whereby torque applied to said input member is divided into two components, one urging said output member against said reaction member, and the other rotating said output member about its axis to produce translational movement of said device along said reaction member, and means for rotating said input shaft.

16. A device comprising a support means, a rotary input member mounted on said support means, a member pivotally mounted on said support means, a rotary output member journaled on said pivoted member for rotation about an axis parallel to and spaced from the axis of rotation of said input member, gear means operatively connecting said input and output members for rotation in opposite senses, a fixed reaction member engaging said output member, means supporting said reaction member at a distance from the pivotal axis of said pivotally mounted member which distance is less than the radius of said output member plus the distance between the axis of said output member and said pivotal axis, whereby torque applied to said input member is divided into two components, one urging said output member against said reaction member, and the other rotating said output member about its axis to produce translational movement of said device along said reaction member, and means for rotating said input member.

17. A device comprising a movable support, a rotary input member mounted on said movable support, means pivotally mounting said movable support, a rotary output member journaled on said movable support for rotation about an axis spaced from the axis of rotation of said input member, gear means operatively connecting said input and output members for rotation in opposite senses, a fixed reaction member engaging said output member, means supporting said reaction member at a distance from the pivotal axis of said movable support which distance is less than the radius of said output member plus the distance between the axis of said output member and said pivotal axis, whereby torque applied to said input member is divided into two components, one urging said output member against said reaction member, and the other rotating said output member about its axis to produce translational movement of said device along said reaction member, and means for rotating said input member.

18. A device of the character described comprising a support member, a fixed reaction member having a reaction surface directed toward said support member; means guiding said support member for movement along said reaction member in paths in which said support member is at a generally constant distance from said surface, a rigid supporting frame pivoted to said support member for angular movement about a pivotal axis on said support member, a rotary output member carried by said frame at a location eccentric to said pivotal axis for bodily movement through a predetermined arcuate path intersecting said reaction surface, and for rotation about an axis transverse to said relative movement, an input member mounted for rotation about an axis substantially coincident with said pivotal axis, and means interconnecting said input and output members for rotation in opposite directions.

19. A device of the character described comprising a support member, a fixed reaction member having a reaction surface directed toward said support member, means guiding said support member for movement along said reaction member in paths in which said support member is at a generally constant distance from said surface; a rigid supporting frame pivoted to said support member for angular movement in a plane generally transverse to said reaction surface and about a pivotal axis on said support member, a rotary output member carried by said frame at a location eccentric to said pivotal axis for bodily movement through a predetermined arcuate path intersecting said reaction surface, and for rotation about an axis transverse to said relative movement, an input member mounted on said frame for rotation about an axis extending in the same general direction as said pivotal axis; and means interconnecting said input and output members for rotation in opposite senses, a rotary power source carried by said device and operatively connected with said input member to transmit rotation thereto in any of the angular positions of said frame.

20. A device of the character described comprising a support member, a fixed reaction member having a reaction surface directed toward said support member, means supporting said support member for movement along said reaction member in paths in which said support member is at a generally constant distance from said reaction surface, a rigid supporting frame pivoted to said support member for angular movement about a pivotal axis on the support member, a rotary output member carried by said supporting frame for rotation about an axis transverse to the direction of said relative movement, said output member being spaced from said pivotal axis for movement through an arcuate path intersecting the path of movement of said reaction member, an input member mounted on said frame for rotation about an axis extending in the same general direction as said pivotal axis, means interconnecting said input and output members for rotation in opposite senses.

21. A device of the character described comprising a support member, a fixed reaction member having a reaction surface directed toward said support member, means supporting said support member for movement along said reaction member in paths in which said support member is at a generally constant distance from said reaction surface; a rigid supporting frame pivoted to said support member for angular movement about a pivotal axis on the support member, a rotary output member carried by said supporting frame for rotation about an axis transverse to the direction of said relative movement, said output member being spaced from said pivotal axis for movement through an arcuate path along a given location of which the periphery of said output member drivingly engages said reaction surface, an input member mounted on said frame for rotation about an axis extending in the same general direction as said pivotal axis, means interconnecting said input and output members for rotation with relatively adjacent portions of their peripheries moving in the same direction; and drive means connected with said input member for transmitting rotation thereto throughout the angular movement of said supporting frame.

22. A device as described in claim 21 including means other than said drive means for urging said frame angularly toward said reaction member to urge said output member into engagement with the reaction surface at a substantially constant pressure.

References Cited by the Examiner

UNITED STATES PATENTS

| | | | |
|---|---|---|---|
| 2,379,021 | 6/1945 | Marchak | 74—333 |
| 2,902,871 | 9/1959 | Mooar | 74—209 |

FOREIGN PATENTS

| | | |
|---|---|---|
| 172,652 | 12/1921 | Great Britain. |
| 182,765 | 2/1922 | Great Britain. |
| 346,958 | 3/1937 | Italy. |

ARTHUR L. LA POINT, *Primary Examiner.*

EUGENE G. BOTZ, *Examiner.*